United States Patent [19]

Wu

[11] Patent Number: 5,984,563
[45] Date of Patent: *Nov. 16, 1999

[54] APPARATUS FOR JOINING SHEET MATERIAL AND JOINT FORMED THEREIN

[75] Inventor: Xinrong Wu, Marysville, Mich.

[73] Assignee: BTM Corporation, Marysville, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/530,202

[22] PCT Filed: Jul. 22, 1994

[86] PCT No.: PCT/US94/08413

§ 371 Date: Aug. 30, 1996

§ 102(e) Date: Aug. 30, 1996

[87] PCT Pub. No.: WO96/03232

PCT Pub. Date: Feb. 8, 1996

[51] Int. Cl.[6] .............. B21D 39/00; B23P 11/00; B23Q 1/00; F16B 5/00
[52] U.S. Cl. ............ 403/282; 403/285; 29/243.5; 29/521; 29/522.1
[58] Field of Search ............... 29/243.5, 283.5, 29/521, 522.1; 403/282, 285

[56] References Cited

U.S. PATENT DOCUMENTS

| | | |
|---|---|---|
| Re. 31,535 | 3/1984 | Schleicher . |
| 567,606 | 9/1896 | McCool et al. . |
| 679,137 | 7/1901 | Baxter . |
| 988,154 | 3/1911 | Thiemer . |
| 1,283,799 | 11/1918 | Kerr . |
| 1,456,079 | 5/1923 | Stuebner . |
| 1,509,997 | 9/1924 | Fry . |
| 1,919,999 | 7/1933 | Borton . |
| 1,926,686 | 9/1933 | Newton . |

(List continued on next page.)

FOREIGN PATENT DOCUMENTS

| | | |
|---|---|---|
| 206465 | 1/1957 | Australia . |
| 1237574 | 6/1988 | Canada . |
| 0 642 853 A1 | 3/1995 | European Pat. Off. . |
| 2371252 | 7/1978 | France ............................ 29/522.1 |
| 98517 | 10/1897 | Germany . |
| 1452650 | 2/1973 | Germany . |
| 2852909A1 | 6/1980 | Germany . |
| 3021332A1 | 12/1981 | Germany . |

(List continued on next page.)

OTHER PUBLICATIONS

TOX publication 262 Nr. 4.1 entitled "Werkzeuge und Werkzeugkenngrossen", "'Neue' Verbindungs–Verfahren im Vergleich", 2 pages (prior to Jul. 22, 1994).
Pressotechnik, "TOX Samman Fogningssystemt ", 2 pages, (prior to Jul. 22, 1994).
Pressotechnik GmbH, "TOX Druckfugetechnik", 2 pages, (prior to Jul., 22, 1994).
Pressotechnik, "TOX–Clinch Technik", 4 pages, (prior to Jul. 22, 1994).
"De–Sta–Co Durchsetzfuge–Technik", 4 pages, (prior to Jul. 22, 1994).
A Complete Inexpensive Sheet Metal Joining System—BTM Corp., (prior to Jul. 22, 1994), (4 pages).
"TOG–L–LOC®/LANCE–N–LOC® Sheet Metal Joining With Unitized Press Tooling" (BTM Corporation) (prior to Jul. 22, 1994) (2 pages).
Atexor Equipment, S.A., "Spot Clinch 0302 AS", 2 pages, copyright 1994–95.

*Primary Examiner*—Anthony Knight
*Attorney, Agent, or Firm*—Harness, Dickey & Pierce, P.L.C.

[57] ABSTRACT

The present invention apparatus for joining sheet material provides a stepped punch (38). This stepped punch (38) serves to strengthen a joint (14) between two or more sheets of material (16 and 18) by creating a stepped segment (122) in at least one of these sheets of material. During formation of this stepped segment (122), material is forcibly displaced toward another segment of material that is outwardly expanded to interlock with the adjacent sheet of material.

25 Claims, 5 Drawing Sheets

U.S. PATENT DOCUMENTS

| | | |
|---|---|---|
| 1,969,214 | 8/1934 | Dit Daude . |
| 1,985,333 | 12/1934 | Wiley . |
| 2,004,182 | 6/1935 | Arey . |
| 2,254,558 | 9/1941 | Williams . |
| 2,278,293 | 3/1942 | Watson . |
| 2,333,966 | 11/1943 | Weiss . |
| 2,404,197 | 7/1946 | Sirp . |
| 2,430,377 | 11/1947 | Vorreyer . |
| 2,467,969 | 4/1949 | Debrot, Jr. . |
| 2,555,836 | 6/1951 | Werich . |
| 2,619,855 | 12/1952 | Williams . |
| 2,626,687 | 1/1953 | Williams . |
| 2,632,929 | 3/1953 | Poupitch . |
| 2,663,072 | 12/1953 | Pfistershammer . |
| 2,671,361 | 3/1954 | Sandberg . |
| 2,685,719 | 8/1954 | Golden . |
| 2,688,890 | 9/1954 | Williams . |
| 2,713,197 | 7/1955 | Schmidt . |
| 2,811,880 | 11/1957 | Williams . |
| 2,865,451 | 12/1958 | Ihrig . |
| 2,924,312 | 2/1960 | Williams . |
| 2,937,681 | 5/1960 | Patten . |
| 3,157,942 | 11/1964 | MacLean, Jr. . |
| 3,177,914 | 4/1965 | MacLean, III et al. . |
| 3,178,749 | 4/1965 | Heepe . |
| 3,187,796 | 6/1965 | Double . |
| 3,198,155 | 8/1965 | Fraze . |
| 3,202,112 | 8/1965 | Oakley . |
| 3,315,345 | 4/1967 | Double et al. . |
| 3,338,463 | 8/1967 | Henrickson . |
| 3,357,388 | 12/1967 | Dunn . |
| 3,359,935 | 12/1967 | Rosbottom . |
| 3,404,648 | 10/1968 | Rosbottom . |
| 3,439,723 | 4/1969 | Double et al. . |
| 3,451,367 | 6/1969 | Henrickson . |
| 3,469,613 | 9/1969 | Steward . |
| 3,470,596 | 10/1969 | Belada . |
| 3,506,050 | 4/1970 | Pouch et al. . |
| 3,579,809 | 5/1971 | Wolf et al. . |
| 3,599,318 | 8/1971 | Behlen . |
| 3,615,274 | 10/1971 | Belada . |
| 3,726,000 | 4/1973 | Hafner . |
| 3,771,216 | 11/1973 | Johnson . |
| 3,791,016 | 2/1974 | Eberhardt et al. . |
| 3,810,290 | 5/1974 | Grube . |
| 3,828,517 | 8/1974 | Johnson . |
| 3,829,957 | 8/1974 | Pouch et al. . |
| 3,862,485 | 1/1975 | Hafner . |
| 3,865,047 | 2/1975 | Hlinsky et al. . |
| 3,877,133 | 4/1975 | Grube . |
| 3,885,299 | 5/1975 | Hafner . |
| 3,900,937 | 8/1975 | Schleicher . |
| 3,919,955 | 11/1975 | DuVernay . |
| 3,920,059 | 11/1975 | Grube . |
| 3,921,276 | 11/1975 | Oaks . |
| 3,924,378 | 12/1975 | Hafner . |
| 3,934,327 | 1/1976 | Hafner . |
| 3,969,808 | 7/1976 | Goodsmith et al. . |
| 3,981,064 | 9/1976 | Hafner . |
| 3,999,659 | 12/1976 | Grube . |
| 4,035,901 | 7/1977 | Lux et al. . |
| 4,059,897 | 11/1977 | Marquis . |
| 4,064,617 | 12/1977 | Oaks . |
| 4,069,902 | 1/1978 | Zdeb . |
| 4,094,352 | 6/1978 | Hlinsky . |
| 4,153,989 | 5/1979 | Shinjo . |
| 4,203,187 | 5/1980 | Grube . |
| 4,208,776 | 6/1980 | Schleicher . |
| 4,237,567 | 12/1980 | Grube . |
| 4,242,793 | 1/1981 | Matthews et al. . |
| 4,269,248 | 5/1981 | MacLean et al. . |
| 4,281,699 | 8/1981 | Grube . |
| 4,306,511 | 12/1981 | Ashby et al. . |
| 4,384,667 | 5/1983 | Smallegan et al. . |
| 4,394,794 | 7/1983 | Shirey . |
| 4,459,735 | 7/1984 | Sawdon . |
| 4,484,385 | 11/1984 | Woods . |
| 4,525,912 | 7/1985 | Kazino et al. . |
| 4,531,279 | 7/1985 | Gunter . |
| 4,569,111 | 2/1986 | Mutou . |
| 4,574,453 | 3/1986 | Sawdon . |
| 4,574,473 | 3/1986 | Sawdon . |
| 4,601,090 | 7/1986 | Gunter . |
| 4,610,072 | 9/1986 | Muller . |
| 4,633,559 | 1/1987 | Loren . |
| 4,658,502 | 4/1987 | Eckold et al. ............... 29/522.1 X |
| 4,660,403 | 4/1987 | Slasinski . |
| 4,722,647 | 2/1988 | Sawdon . |
| 4,752,993 | 6/1988 | Oaks . |
| 4,757,609 | 7/1988 | Sawdon . |
| 4,803,767 | 2/1989 | Obrecht et al. . |
| 4,831,704 | 5/1989 | Rapp . |
| 4,878,284 | 11/1989 | Sawdon . |
| 4,910,853 | 3/1990 | Sawdon . |
| 4,928,370 | 5/1990 | Eckhold et al. . |
| 5,010,714 | 4/1991 | Medwed et al. ............... 29/521 X |
| 5,027,503 | 7/1991 | Sawdon . |
| 5,031,442 | 7/1991 | Kynl . |
| 5,051,020 | 9/1991 | Schleicher . |
| 5,150,513 | 9/1992 | Sawdon . |
| 5,155,897 | 10/1992 | Schleicher . |
| 5,177,861 | 1/1993 | Sawdon . |
| 5,208,973 | 5/1993 | Sawdon . |
| 5,259,102 | 11/1993 | Obrecht . |
| 5,267,383 | 12/1993 | Sawdon . |
| 5,305,517 | 4/1994 | Schleicher . |
| 5,315,743 | 5/1994 | Schleicher . |
| 5,425,262 | 6/1995 | Dubugnon ............................ 72/450 |
| 5,435,049 | 7/1995 | Sawdon . |
| 5,806,362 | 9/1998 | Dubugnon ........................ 72/453.04 |

FOREIGN PATENT DOCUMENTS

| | | |
|---|---|---|
| 3210208 | 11/1984 | Germany . |
| 4214475A1 | 11/1993 | Germany . |
| 4317278A1 | 12/1993 | Germany . |
| 4335318A1 | 4/1994 | Germany . |
| 41-5589 | 3/1966 | Japan . |
| 42-14680 | 8/1967 | Japan . |
| 48-42707 | 12/1973 | Japan . |
| 54-107868 | 8/1979 | Japan . |
| 54-113753 | 9/1979 | Japan . |
| 56-59540 | 5/1981 | Japan . |
| 63-177931 | 7/1988 | Japan . |
| 63-192524 | 8/1988 | Japan . |
| 664979 | 1/1952 | United Kingdom . |
| 708236 | 4/1954 | United Kingdom . |
| 713625 | 8/1954 | United Kingdom . |
| 895561 | 5/1962 | United Kingdom . |
| 930164 | 7/1963 | United Kingdom . |
| 934101 | 8/1963 | United Kingdom . |
| 945110 | 12/1963 | United Kingdom . |
| 1008914 | 11/1965 | United Kingdom . |
| 1041119 | 9/1966 | United Kingdom . |
| 1101795 | 1/1968 | United Kingdom . |
| 1114826 | 5/1968 | United Kingdom . |
| 1202275 | 8/1970 | United Kingdom . |
| 1378534 | 12/1974 | United Kingdom . |
| 1551353 | 8/1979 | United Kingdom . |
| 2055648 | 3/1981 | United Kingdom . |
| 2069394 | 8/1981 | United Kingdom . |
| 2071000 | 12/1983 | United Kingdom . |
| WO91/15316 | 10/1991 | WIPO . |
| WO92/18264 | 10/1992 | WIPO . |
| WO94/22613 | 10/1994 | WIPO . |

1

APPARATUS FOR JOINING SHEET MATERIAL AND JOINT FORMED THEREIN

BACKGROUND AND SUMMARY OF THE INVENTION

The present invention relates generally to an apparatus for joining sheet material and specifically to a punch and a joint, each having a step therein.

It is common within the metal forming industry to join pieces of sheet metal by punching or otherwise deforming them to cause an interlocking relationship in a localized area. However, these traditional joints have typically required shearing of the sheet material. Thus, these joints tend to leak and also have their corrosion resistant coatings destroyed.

More recently, an apparatus has been used for joining two or more sheets of material together by creating a leakproof and secure joint. These improved conventional joints are created by use of a punch acting against an anvil to produce what is known as a TOG-L-LOC® joint therebetween. Such a leakproof joint is disclosed in U.S. Pat. Nos. 5,267,383 and 5,177,861, both of which are entitled "Apparatus for Joining Sheet Material" and issued to Sawdon. The disclosures of these patents are incorporated by reference herewithin.

The conventional TOG-L-LOC® leakproof joints consist of two or more sheets of material having a button or joint formed therebetween by a uniformly cylindrical punch forcibly pushing a punch side sheet of material into interlocking engagement with a die side sheet of material. These conventional leakproof joints have seen tremendous commercial success for use in varied applications such as steel microwave ovens and aluminum automotive bodies. While these leakproof joints have proven reliable and inexpensive, it would be desirable to have an even stronger leakproof joint.

In accordance with the present invention, an improved apparatus for joining sheet material provides a stepped punch. This stepped punch serves to strengthen a joint between two or more sheets of material by creating a stepped segment in at least one of these sheets of material. During formation of this stepped segment, material is forcibly displaced toward another segment of material that is outwardly expanded to interlock with the adjacent sheet of material.

The punch and joint of the present invention are advantageous over conventional punches and joints by achieving a surprisingly stronger leakproof joint. Furthermore, the joint of the present invention has improved wall thickness that is more resistant to fracture as compared to conventional leakproof joints. The punch, joint and method of the present invention thus reduce scrap during the joint forming process. Additional advantages and features of the present invention will become apparent from the following description and appended claims, taken in conjunction with the accompanying drawings.

DETAILED DESCRIPTION OF THE PREFERRED EMBODIMENT

It has been found that a conventional interlocking leakproof joint is strong and inexpensively formed. Such a conventional leakproof joint is formed by using a substantially constant diameter punch to draw a punch side sheet of material downward into interlocking engagement with a die side sheet of material. The punch side sheet of material has a cylindrical recessed cup internally formed therein while the lower peripheral external section of the punch side sheet of material is outwardly expanded. This expanded section of the punch side sheet of material interlocks with the adjacent section of the die side material and serves to outwardly expand the adjacent section thereof thereby defining an external button or joint immediately adjacent the anvil. An increase of fracture resistance in the necking area of the side wall will lead to a reduction of pullout strength in the interlocking of the button and vice versa. Although an optimum joint's strength can be obtained by carefully selecting appropriate tooling parameters, the carrying load of this conventional joint is limited because of the transformation of failure mechanisms (i.e., the maximum joint strengths cannot exceed the intersecting point of a fracture resistance curve and pullout strength curve as will be later discussed herein).

Based on the discussion above, an effort has been made to raise both fracture and pullout strengths of a joint at the same time. Consequently, a stepped punch of the present invention was developed. The idea to use the stepped punch of the present invention is to bring more material from somewhere in the sheet metal on the punch side to the joint element, and to increase simultaneously both thickness of the thinned side wall and locking volume in the interlocking expanded segment of the joint. Higher strengths for both shear and peel tests are expected if a stepped punch is appropriately designed.

Thus, the conventional joint has been surprisingly strengthened to a significant extent by forcibly deforming a step within the punch side sheet of material. This added step has provided a joint with tremendously improved strength while being relatively simple to create. The improved apparatus and joint is described hereinafter.

Figure 1:
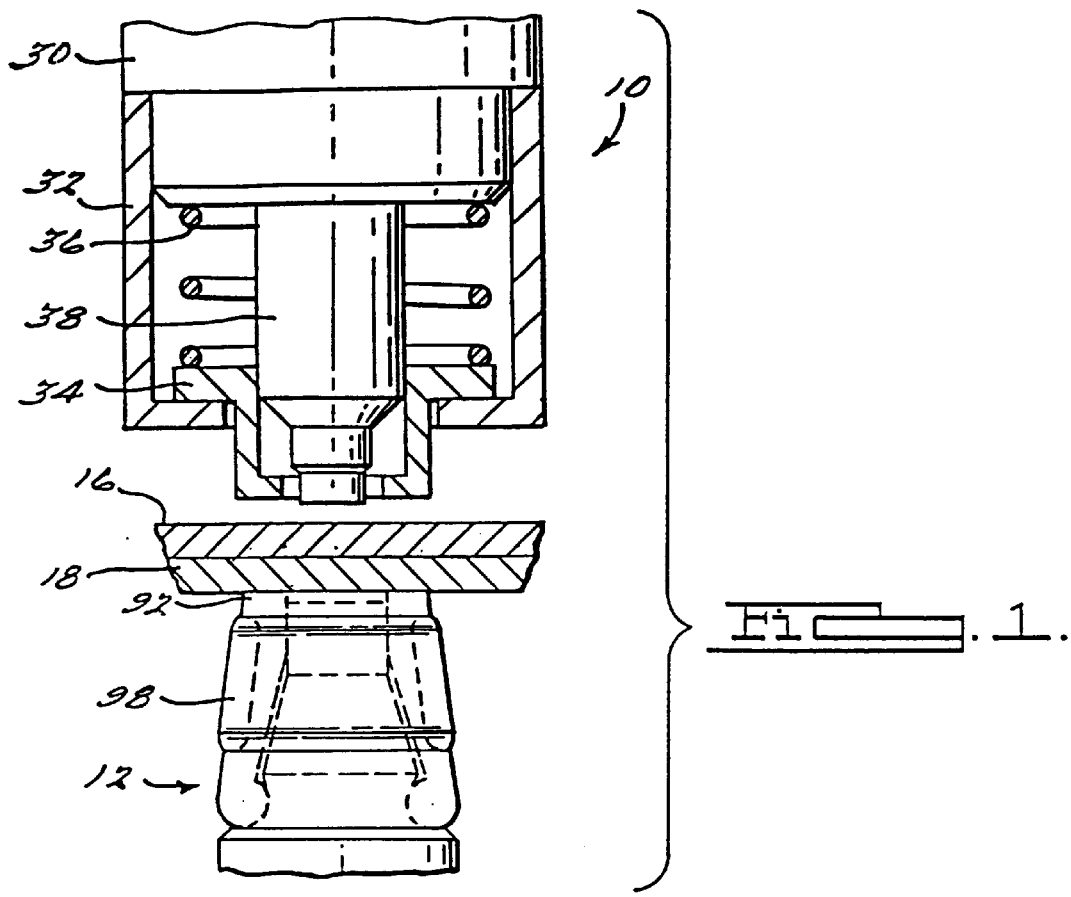
FIG. 1 is a side elevational view, partially in section, of a preferred embodiment apparatus for joining sheet material of the present invention, shown in its retracted position.
Figure 2:
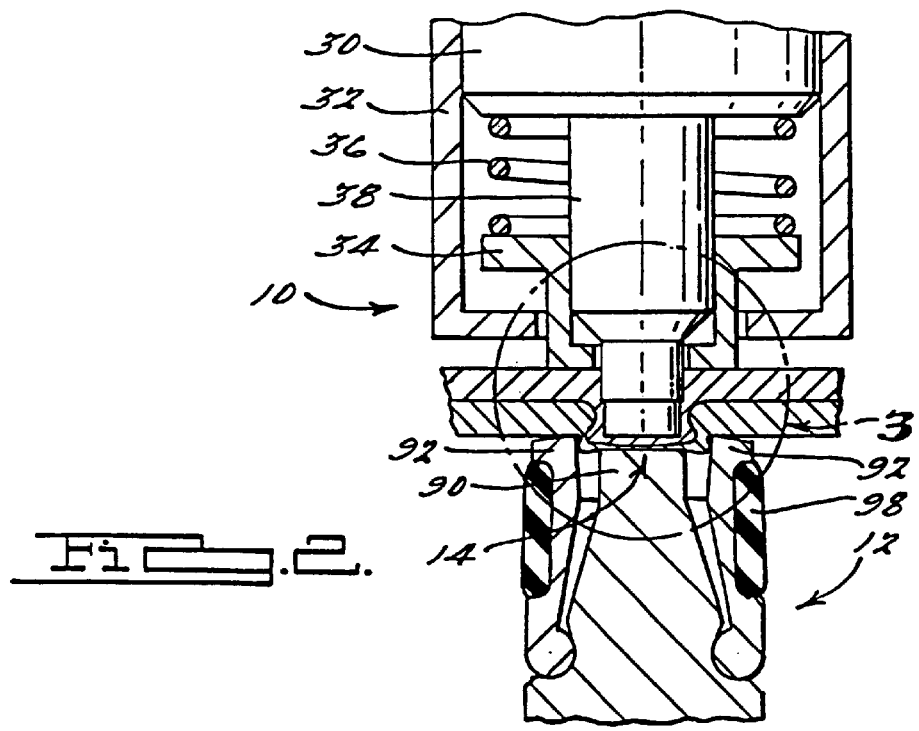
FIG. 2 is a side elevational view, partially in section, of the preferred embodiment apparatus of the present invention of FIG. 1, shown in its advanced position.

Referring to FIGS. 1 and 2, a preferred embodiment of an apparatus of the present invention is comprised of a punch assembly 10 and a die 12. Punch assembly 10 and die 12 serve to form a joint or button 14 between a first sheet of material 16 and an adjacent second sheet of material 18.

Punch assembly 10 has a punch holder 30, a stripper can 32, a stripper tip 34, a stripper spring 36 and a punch 38. As can best be observed in FIG. 3, punch 38 is defined by a distal drawing end 50, a cylindrical first drawing portion 52, a somewhat frusto-conical step 54, a cylindrical second drawing portion 56, a frusto-conical carrying portion 58 and a punch support shank 60. A longitudinal axis runs the length of punch 38. A first radius 70 is disposed on the peripheral edge of first drawing portion 52. First radius 70 is preferably 0.02 inches. A 0.01 inch radius defines a fillet 72 disposed at the theoretical intersection between first drawing portion 52 and step 54. First drawing portion 52 has a slight draft angle between radius 70 and fillet 72 in order to remove punch 38 from joint 14. A corner 74 is located on the peripheral edge of second drawing portion 56. Alternatively, corner 74 may have a radius thereupon.

Ideally, the punch length and diameters are adjustable depending on the thickness of the sheet material employed for joint 14. For example, when first and second sheets of material, 16 and 18, respectively, are each 2 mm thick aluminum, the longitudinal length of first drawing portion 52 is 0.095 inches. First drawing portion 52, proximate to its theoretical intersection with distal drawing end 50, has a diameter of 0.19 inches. By way of contrast the constant diameter drawing portion of the conventional leakproof joint punch without a step is 0.18 inches. Second drawing portion 56, proximate to its theoretical intersection with step 54, has a diameter of 0.21 inches. It has been found that it is preferable to depress punch 38 into the sheets of material 16 and 18 a sufficient depth such that the corner between step 54 and second drawing portion 56 is coplanar with the contacting surfaces between first and second sheets of material, respectively 16 and 18. The drawing depth can be roughly calculated as follows:

$$dt = T_1 + T_2$$

dt is defined as the total depth of punch between a surface of first sheet of material 16 immediately adjacent stripper tip 34 to distal drawing end 50;

$T_1$ is defined as the thickness of the first sheet of material 16; and $T_2$ is defined as the thickness of the second sheet of material 18.

It may also be desirable to add up to 0.015 inches to the right side of the preceding equation to allow for any margin of error.

Figure 3:
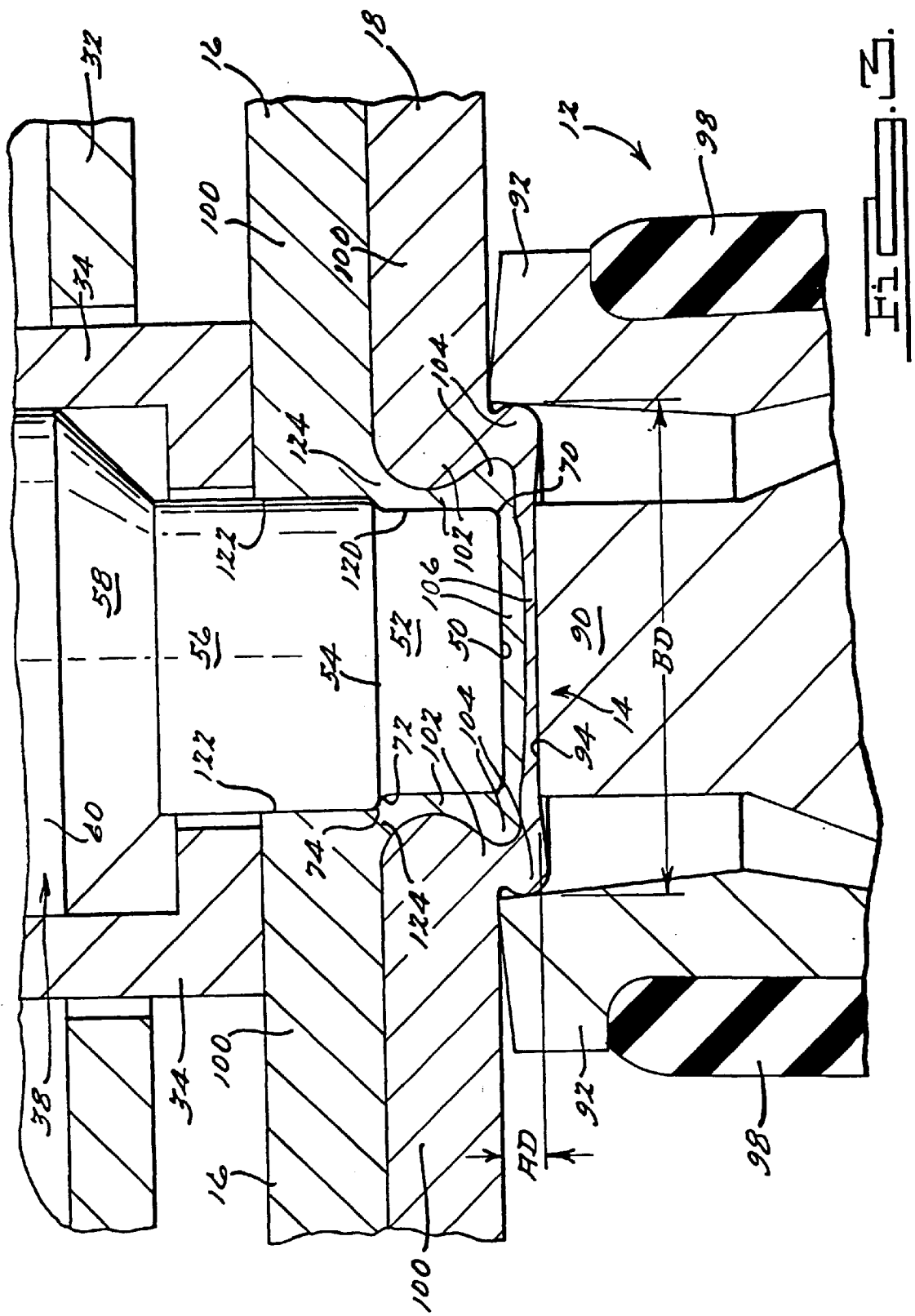
FIG. 3 is an enlarged side elevational view, partially in section and taken from within circle 3—3 of FIG. 2, of the preferred embodiment apparatus of the present invention.

Referring now to FIGS. 2 and 3, die 12 has a substantially cylindrical anvil 90 surrounded by a set of die blades 92 which are laterally movable away from anvil 90 during formation of joint 14. Anvil 90 preferably has a flat face which mirrors the flat shape of distal punching end 50 of punch 38. Die blades 92 are retained to die 12 by an elastomeric band 98. Elastomeric band 98 is expandable to allow die blades 92 to pivot away from anvil 90 during formation of joint 14. Elastomeric band 98 then serves to move die blades 92 back toward anvil 90 upon removal of joint 14 from die 12. Elastomeric member 98 can alternately be replaced by a canted spring, compression spring, leaf spring or the like.

As can best be observed in FIG. 3, joint 14 between first sheet of material 16 and second sheet of material 18 is defined by nominal segments 100, recessed or side wall segments 102, outwardly expanded segments 104, and bridging segments 106. Additionally, recessed segment 102 of first sheet of material 16 has an inside surface 120. A stepped segment 122 of first sheet of material 16 is located along inside surface 120 proximate with a bend 124 thereof.

The leakproof joint of the present invention and the apparatus used to create the joint of the present invention provide surprisingly significant advantages over conventional joints. The stepped portion of the present invention punch acts to create a stepped segment within the joint, thereby moving otherwise unuseful material toward the expanded segment of the joint.

The stepped punch 38 employs two different diameters acting on a particular region of the joint. This punch 38 brings two punch penetrations to the material sheets 16 and 18 in a single press stroke. It overcomes the problem that the side wall can be thickened only at the expense of a reduction in the interlocking. During the process of forming a stepped joint, the first drawing portion 52 with a smaller diameter acts just like the regular punch, drawing material towards the die opening to form a joint. The second drawing portion 56 with a bigger diameter acts like a second punch that extrudes and pushes down some material in the side wall of the punch side so as to create a cup-shaped inner recess therein. As a mater of fact, the first drawing portion squeezes the sheet metal on the bottom of the cup (bridging segments 106 between the punch and die), and the second portion of punch 38 squeezes the material in the side wall of the cup. The final joint 14 is then removed from the die and punch.

The action of the bigger second drawing portion is expected to obtain the following effects: increasing material volume in the joint element; thickening the cup-shaped wall in the joint; squeezing the material right below the cup-shaped wall outward to increase the interlocking; increasing the hardening of material in the thinned wall and interlocking by bringing more deformation to the material. The second effect will increase the fracture strength, while the third effect will result in a better resistance to a pullout failure. The last effect will benefit both fracture and pullout strengths.

There is a difference in the thickness of the thinned region and shape of the interlocking between the stepped and conventional leakproof joints. For the joint made by a stepped punch, the cup shaped recessed wall is thicker and the material in the interlocking expanded segment, especially in the gap between die blades, moves outward more than in conventional joints. They contribute to the increase of both fracture and pullout resistance. That is why a higher load carrying ability is observed for the present invention joint made by a stepped punch.

Figure 8:
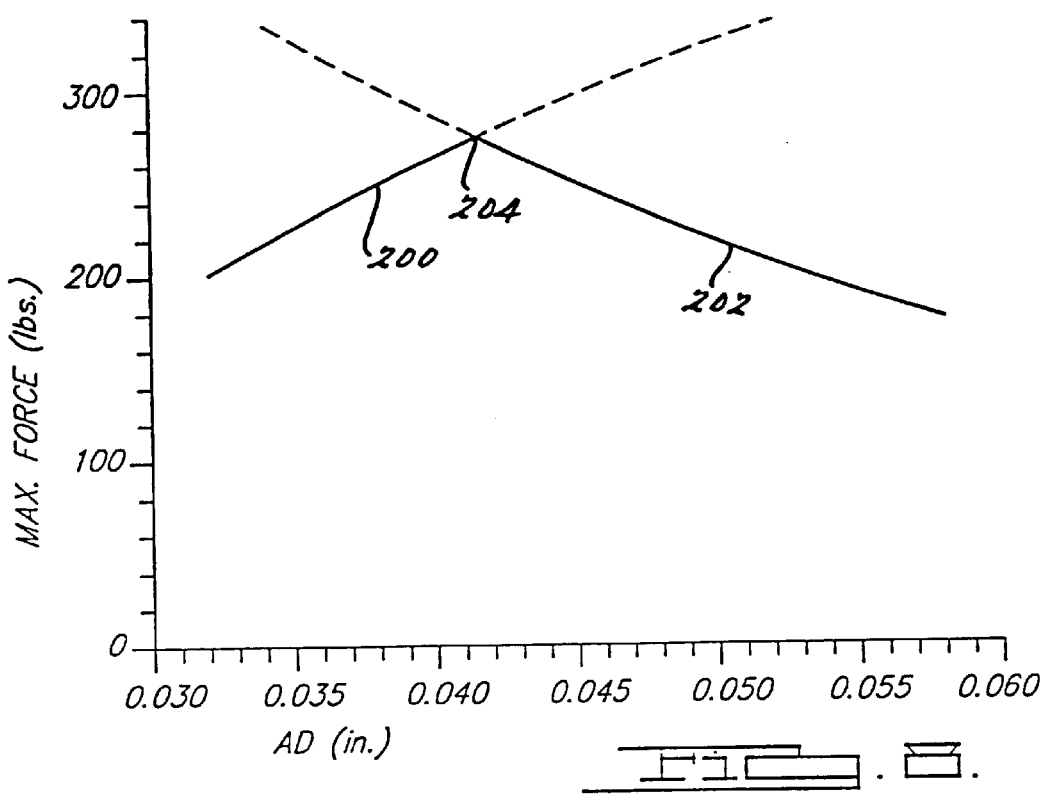
FIG. 8 is a graph optimizing the anvil depth of a joint created by the preferred embodiment of the present invention apparatus of FIG. 3.

As can be seen in FIG. 8, the effect of anvil depth (AD) on peel strength and failure mode can be optimized. FIG. 8 discloses peel test forces versus anvil depth for two sheets of material made from steel grade A366. Each sheet of steel had a thickness of 0.060 inches while the punch diameter was 0.190 inches and the button diameter (BD) measured 0.285 inches. Curve 200 schematically charts the failure by pullout test results while curve 202 schematically depicts the failure by fracture test results. The intersection of 204 of these two curves provides the optimum anvil depth for the present invention joint.

Figure 9:
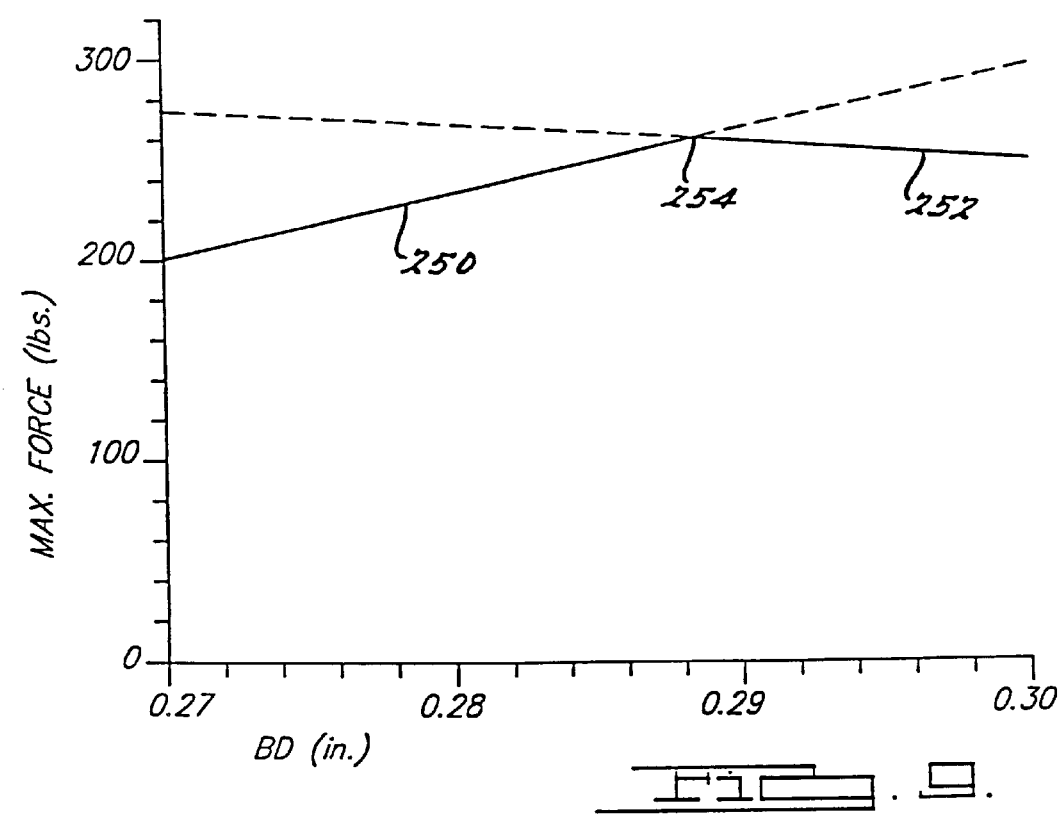
FIG. 9 is a graph optimizing the button diameter of a joint created by the preferred apparatus of the present invention of FIG. 3.

Referring to FIG. 9, the effect of button diameter (BD) based on peel strength and failure mode is shown. This test employs two sheets of steel, grade A366, each having a thickness of 0.060 inches. The punch used for this test had a first drawing portion diameter of 0.190 inches while the anvil depth (AD) measured 0.040 inches. Curve 250 depicts the pullout failure results while curve 252 depicts the side wall fracture failure results. The intersection 254 between curves 250 and 252 demonstrates the optimum button diameter. Of course, additional trial and error may be required to adjust the various punch and anvil dimensions based upon individual sheet material batch thicknesses and differing material types.

Figure 4:
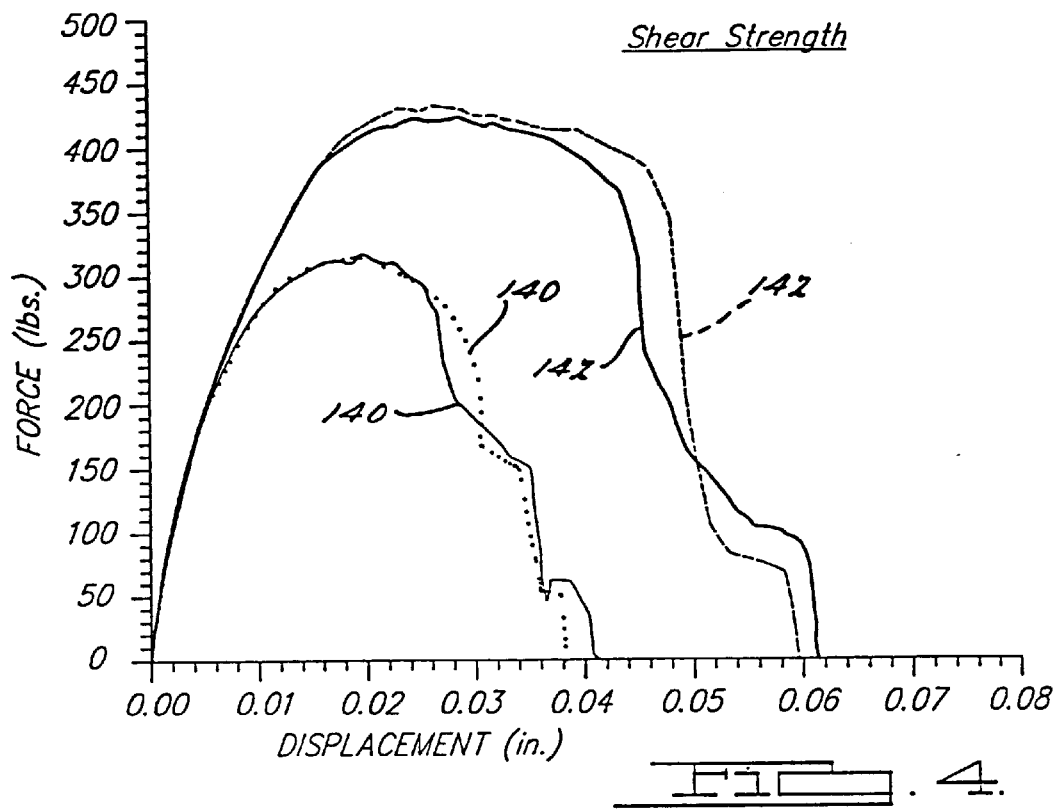
FIG. 4 is a graph comparing the shear strength of a joint in aluminum created by the preferred apparatus of the present invention of FIG. 3 as compared to a conventional leakproof joint without a step therein.
Figure 5:
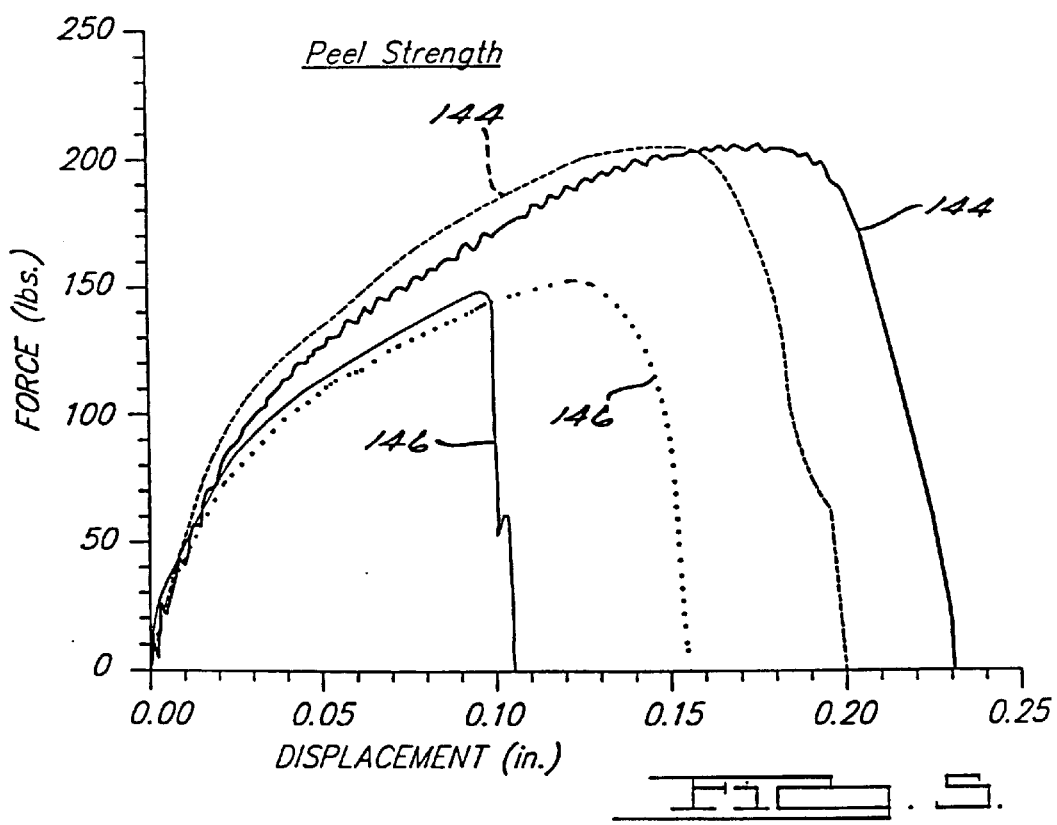
FIG. 5 is a graph comparing the peel strength of a joint in aluminum created by the preferred apparatus of the present invention of FIG. 3 as compared to a conventional leakproof joint without a step therein.

Test results demonstrating the significant improvement in the present invention joint can be observed in FIGS. 4 and 5. FIG. 4 graphically represents a sheer strength test comparing conventional leakproof joints 140, without a step, to the present invention leakproof joints 142 having a stepped segment therein. Both joints were formed using 0.190 inch diameter first drawing portions. An 8000 series Instron machine was used to perform these tests. Each test was performed twice. It will be noted that the present invention joint shown in FIG. 4 has significantly improved shear strength over the conventional joint without a step.

FIG. 5 graphically depicts a peel strength test comparing the present invention leakproof joint 144 to a conventional leakproof joint 146 without a step. Again, two tests were conducted for each type of joint. It will be noted that the present invention joint 144, having a step therein, has significantly improved peel strength over the conventional joint 146. Aluminum grade 5754, having a thickness of 2 mm, was used for each material sheet for the above shear and peel strength tests. For the conventional joint, the button had a diameter of 0.298 inches (BD) while the present invention joint had a button diameter of 0.323 inches. The anvil depth (AD) of joint was 0.040 inches for the conventional joint and 0.045 inches for the present invention joint.

Figure 6:
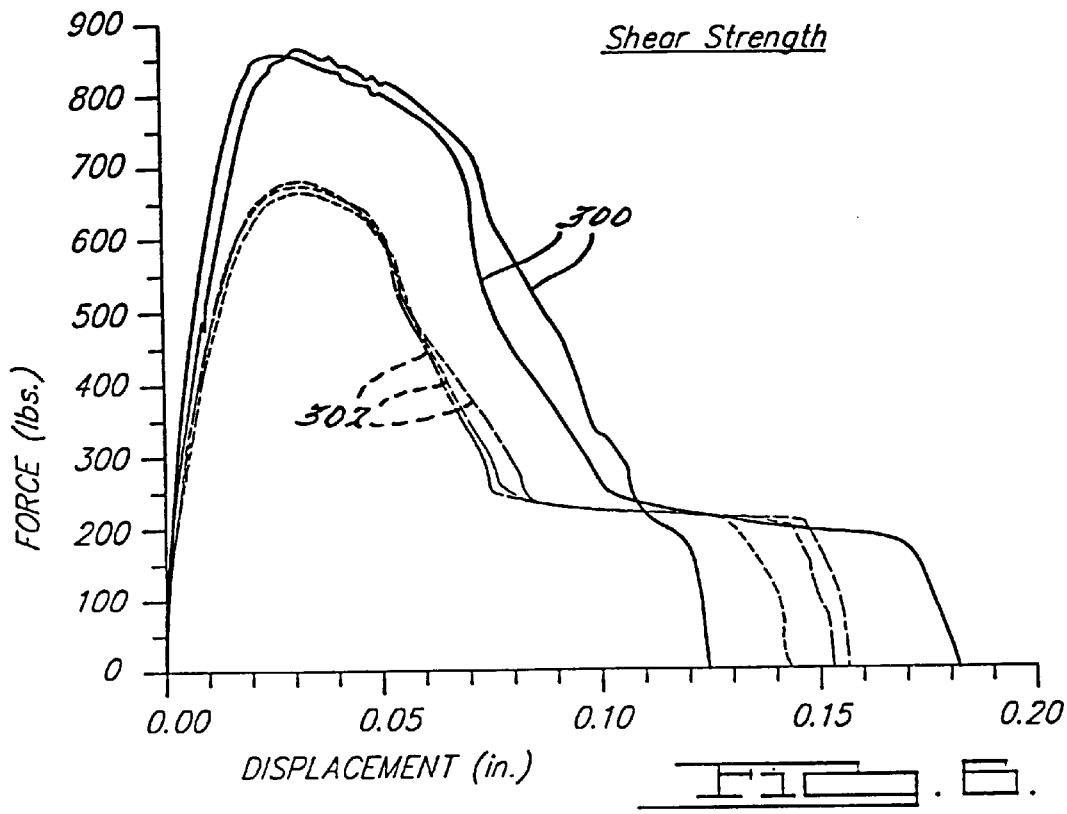
FIG. 6 is a graph comparing the shear strength of a joint in steel created by the preferred apparatus of the present invention of FIG. 3 as compared to a conventional leakproof joint without a step therein.
Figure 7:
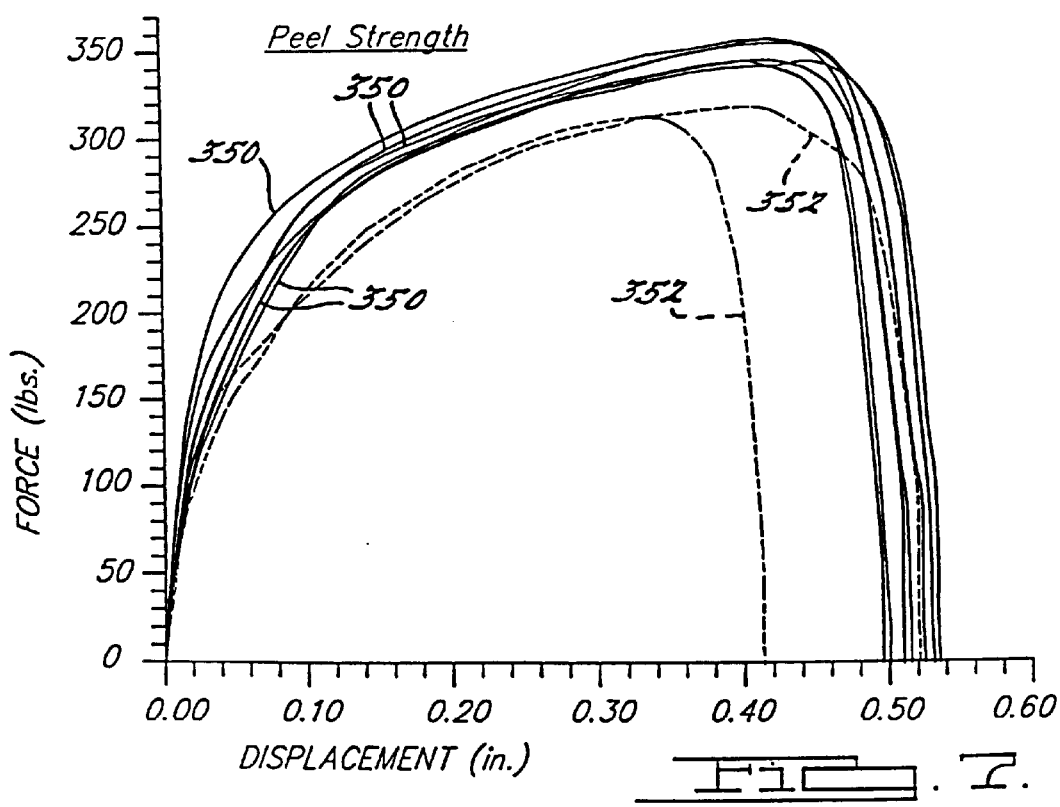
FIG. 7 is a graph comparing the peel strength of a joint in steel created by the preferred embodiment of the present invention apparatus of FIG. 3 as compared to a conventional leakproof joint without a step therein.

Shear strength testing results for two steel sheets of material are shown in FIG. 6. Fourteen gauge, grade A366 steel was used. The stepped punch had an anvil depth (AD) of 0.050 inches and created a button diameter (BD) of 0.320 inches while the conventional punch had an anvil depth (AD) of 0.045 inches and created a button diameter (BD) of 0.305 inches. The results for the stepped punch are shown with the solid lines 300 and the results for the conventional joint, without a step therein, are shown with the dashed lines 302. The stepped present invention joint 300 test was repeated twice while the conventional joint 302 test were repeated three times. FIG. 7 graphically represents the peel strength test results for the same sized steel, punch apparatus and joint as that of FIG. 6. The stepped joint of the present invention is shown by the solid lines 350. The test was repeated five times for the present invention joint 350 and twice for the conventional joint 352.

While the preferred embodiment of this apparatus and joint has been disclosed, it will be appreciated that various modifications may be made without departing from the present invention. For example, the punch of the present invention may have multiple stepped portions thereof between three or more differing diameter drawing portions. Furthermore, while the punch of the present invention has been disclosed as having cylindrical portions thereon, these drawing portions may alternately have ovular, starred, polygonal or other shapes thereto. The distal drawing end of the punch or the anvil face of the die may also take on a variety of curved, slotted or angular configurations. Moreover, alternate die constructions may be provided in combination with the present invention punch or joint. Either of the sheets of material can be metallic vinyl, polymeric, composite, or any other deformable material. Of course, three or more sheets of material may also be used consistent with the present invention. The stepped configuration of the present invention can also be used in a TOX® joint wherein a die blade is fixed around and partially extends above an anvil with a trough therebetween. The TOX® joint is defined by a die-side second material sheet forced to expand downwardly into the trough when a first punch side material sheet is outwardly expanded to interlock with the second material sheet. Various materials and dimensions have been disclosed in an exemplary fashion, however, a variety of other materials and dimensions may of course be employed. It is intended by the following claims to cover these and any other departures from the disclosed embodiments which fall within the true spirit of this invention.

What is claimed is:

1. An apparatus for joining at least two sheets of material, said apparatus comprising:

a punch having a distal end movable in a longitudinal direction, a first cylindrical portion of said punch located longitudinally adjacent to said distal end, a second cylindrical portion of said punch located longitudinally adjacent to said first portion opposite said distal end;

a step having a longitudinal dimension less than a thickness of one of said sheets of material, said second portion of said punch having a first lateral dimension relatively larger than said first portion of said punch such that said step is disposed between said portions;

said first lateral dimension being laterally smaller than an outside lateral dimension of a joint formed by said punch as measured at an intersection with said step;

said step having an orientation between zero and eighty nine degrees, inclusive, inclining from said first portion toward said second portion of said punch;

a stripper assembly located adjacent a portion of said punch, said stripper assembly being prevented from substantially deforming said sheets of material during advancing movement of said punch; and a longitudinally fixed anvil located adjacent one of said sheets of material opposite said punch;

whereby said punch is operatively movable against said sheets of material to forcibly deform and interlock segments of said sheets of material, said step of said punch being movable to forcibly create a step in at least one of said sheets of material.

2. The apparatus of claim 1 further comprising:

a fillet disposed on said punch at an intersection of said first portion and said step.

3. The apparatus of claim 2 further comprising:

a radius disposed on said punch at an intersection between said step and said second portion.

4. The apparatus of claim 1 further comprising:

a first radius disposed on said punch at an intersection between said distal end and said first portion.

5. The apparatus of claim 1 further comprising a die which includes:

said anvil being coaxially aligned with said first and second portions of said punch, said anvil having a face thereon defined as a substantially mirror image shape coincidental with said distal end of said punch;

a set of die blades substantially surrounding said anvil and being laterally movable away from said anvil during forcible deformation of said sheets of material; and means for retaining said set of die blades against said die and for returning said set of die blades against said anvil upon removal of said sheets of material.

6. The apparatus of claim 1 wherein upon said forcible deformation of said sheets of material between said punch and said anvil, a first segment of said sheets of material proximate with said intersection between said distal end and said first portion of said punch are laterally expanded so as to interlock with one another, said step and said second portion of said punch further deform and push a second segment of at least one of said sheets of material toward said first segment of said sheets of material.

7. The apparatus of claim 1 further comprising:
   a die blade disposed about said anvil and at least partially extending above said anvil; and
   a trough disposed between said anvil and said die blade.

8. The apparatus of claim 1 wherein said step is disposed within 1 2/3 nominal thicknesses of one of said sheets of material from said distal end of said punch.

9. A joint formed between a first sheet of material and a second sheet of material created by moving a punch against a fixed anvil, said joint comprising:
   nominal segments of said first and second sheets of material;
   recessed segments of said first and second sheets of material joined to said nominal segments by bent segments;
   an outwardly expanded segment of said first sheet of material interlocking with said second sheet of material, said outwardly expanded segment of said first sheet of material extending from said recessed segment; and
   a stepped segment formed in said recessed segment of said first sheet of material, said stepped segment being disposed over half of a nominal segment thickness in said first sheet of material, a button diameter of said recessed segments being greater than an outermost diameter of said stepped segment;
   wherein said stepped segment has an orientation between zero and eighty nine degrees, inclusive, inclining from said recessed segment toward said nominal segments.

10. The joint of claim 9 wherein an inside surface of said recessed segment of said first sheet of material is substantially cylindrical in shape.

11. The joint of claim 10 wherein said stepped segment is disposed along at least a portion of said inside surface of said first sheet of material proximate with said bend.

12. The joint of claim 9 further comprising:
   bridging segments spanning between said outwardly expanded segment of said first sheet of material and an outwardly expanded segment of said second sheet of material.

13. The joint of claim 12 wherein said bridging segments of said first and second sheets of material are substantially flat and parallel to said nominal segments.

14. The joint of claim 9 wherein formation of said stepped segment causes material to be displaced toward said outwardly expanded segment of said first sheet of material.

15. The joint of claim 9 wherein at least a portion of said stepped segment is substantially disposed along a plane defined by mating nominal surfaces of said first and second sheets of material.

16. A joint formed between at least a first sheet of material and a second sheet of material created by a single moving stepped punch acting against a die assembly having a fixed anvil and a set of laterally movable die blades, said joint comprising:
   nominal segments of said first and second sheets of material;
   recessed segments of said first and second sheets of material formed in said nominal segments; and
   a stepped segment of said first sheet of material formed along at least a portion of said recessed segment by movement of said stepped punch, a tangent of said stepped segment substantially located along a plane defined by mating nominal surfaces of said first and second sheets of material;
   whereby said stepped punch, fixed anvil and die blades serve to increase material in the joint while interlocking said first sheet of material with said second sheet of material.

17. The joint of claim 16 further comprising a button diameter being greater than a diameter of said stepped segment.

18. A method of forming a joint having a button diameter between at least a first sheet of material and a second sheet of material by using a longitudinally movable punch and a fixed anvil, said method comprising:
   (a) compressing segments of said first and second sheets of material between said movable punch and said fixed anvil;
   (b) creating an abruptly stepped segment in said first sheet of material closest to said punch;
   (c) forcibly displacing material from said stepped segment of said first sheet of material toward a further recessed segment in the same punching action as used in step (b) by forming all of said stepped segment laterally inboard of said button diameter of said joint;
   (d) outwardly expanding a segment of said first sheet of material;
   (e) interlocking an expanded segment of said first sheet of material with an adjacent segment of said second sheet of material; and
   (f) withdrawing said sheets of material from between said punch and said fixed anvil.

19. The method of claim 18 further comprising the step of:
   (a) expanding said adjacent segment of said second sheet of material adjacent to said expanded segment of said first sheet of material.

20. An apparatus for joining at least two sheets of material, said apparatus comprising:
   a punch movable along a longitudinal axis and having a distal end, a first portion of said punch located longitudinally adjacent said distal end, a second portion of said punch located longitudinally adjacent said first portion opposite said distal end, said second portion of said punch having a larger lateral dimension relative to said first portion of said punch;
   a step located between said portions; and
   a set of laterally movable die blades located adjacent a surface of said sheets of material opposite said punch;
   said punch being operatively movable against said sheets of material to forcibly deform and interlock together said sheets of material in a leakproof manner, said step of said punch being movable to forcibly create a step in at least one of said sheets of material in a simultaneous action with said first portion of said punch, said step of said punch forming a stepped formation in at least one of said sheets of material, a fillet of said stepped formation having a tangent substantially coplanar with adjacent surfaces of said sheets of material.

21. The apparatus of claim 20 further comprising:
   a stripper assembly located adjacent said punch, said stripper assembly being prevented from substantially deforming said sheets of material during advancing movement of said punch;

wherein said first portion of said punch is cylindrical about said longitudinal axis of said punch; and wherein said second portion of said punch is cylindrical about said longitudinal axis of said punch.

22. The apparatus of claim 20 further comprising a die acting in cooperation with said punch to forcibly deform said sheets of material therebetween, wherein said die includes:

a fixed anvil coaxially aligned with said first and second portions of said punch, said anvil having a face defined as a substantially mirror image shape coincidental with said distal end of said punch;

said set of die blades substantially surrounding said anvil and being laterally movable away from said anvil during forcible deformation of said sheets of material; and means for retaining said set of die blades to said die and for returning said set of die blades against said anvil upon removal of said sheets of material.

23. The apparatus of claim 22 wherein upon said forcible deformation of said sheets of material between said punch and said die, a first segment of said sheets of material proximate with said intersection between said distal end and said first portion of said punch are laterally expanded so as to interlock with one another, said step and said second portion of said punch further deform and push a second segment of at least one of said sheets of material toward said first segment of said sheets of material.

24. A method of forming a leakproof joint between at least a first sheet of material and a second sheet of material by using a punch, a stripper assembly and a die having die blades, said joint having a button diameter, said method comprising:

(a) compressing segments of said first and second sheets of material between said punch and said die;

(b) creating an abruptly stepped segment in said first sheet of material closest to said punch, said abruptly stepped segment having a diameter less than said button diameter;

(c) forcibly displacing material from said stepped segment of said first sheet of material toward a further recessed segment;

(d) expanding a segment of said first sheet of material outwardly while laterally moving said die blades;

(e) interlocking an expanded segment of said first sheet of material with an adjacent segment of said second sheet of material;

(f) maintaining a substantially uniform thickness of said second sheet of material laterally adjacent said joint;

(g) withdrawing said sheets of material from between said punch and said die; and (h) preventing said stripper assembly from substantially deforming said sheets of material.

25. An apparatus for joining sheets of material, said apparatus comprising:

a punch movable along a longitudinal axis, a first portion of said punch having a smaller lateral dimension relative to an adjacent second portion of said punch;

a substantially continuous and lateral step located between said portions, at least a section of said step being curved;

a set of laterally movable die blades located adjacent a surface of said sheets of material opposite said punch;

said punch being operatively movable against said sheets of material to forcibly deform and interlock together said sheets of material in a leakproof manner, said step of said punch being movable to forcibly create a step in at least one of said sheets of material; and a stripper located adjacent said punch, said stripper being prevented from substantially deforming said sheets of material during advancing movement of said punch.

* * * * *

UNITED STATES PATENT AND TRADEMARK OFFICE
CERTIFICATE OF CORRECTION

PATENT NO.    : 5,984,563
DATED         : November 16, 1999
INVENTOR(S)   : Xinrong Wu It is certified that error appears in the above-identified patent and that said Letters Patent is hereby corrected as shown below:

Title page,
Item [56], OTHER PUBLICATIONS, "Samman Fogningssystemt" should be
-- Sammanfogningssystem --.

Column 4,
Line 24, "mater" should be -- matter --.

Signed and Sealed this

Seventeenth Day of December, 2002

JAMES E. ROGAN
*Director of the United States Patent and Trademark Office*